(12) United States Patent
Pinter et al.

(10) Patent No.: US 7,456,727 B2
(45) Date of Patent: *Nov. 25, 2008

(54) SYSTEM AND METHOD FOR ENHANCED ALERTNESS AND EFFICIENT DISTRIBUTED MANAGEMENT FOR VIDEO SURVEILLANCE

(75) Inventors: Marco Pinter, Santa Barbara, CA (US); Bradley E. Paden, Santa Barbara, CA (US); Fiona M. Gaston, Santa Barbara, CA (US)

(73) Assignee: Magnetic Moments, LLC, Goleta, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 11/328,719

(22) Filed: Jan. 9, 2006

(65) Prior Publication Data

US 2006/0220796 A1  Oct. 5, 2006

Related U.S. Application Data

(62) Division of application No. 10/309,986, filed on Dec. 3, 2002, now Pat. No. 6,985,079.

(51) Int. Cl.
*G08B 9/00* (2006.01)

(52) U.S. Cl. ............. 340/286.02; 340/540; 340/539.25; 340/575; 340/573.1; 340/3.1; 348/143; 434/236; 434/362

(58) Field of Classification Search ............ 340/286.02, 340/286.01, 539.25, 540, 541, 573.1, 575, 340/3.1; 348/143, 152, 153, 159; 434/236, 434/362
See application file for complete search history.

(56) References Cited

U.S. PATENT DOCUMENTS

| 6,166,763 | A  | * | 12/2000 | Rhodes et al. | ............... | 348/143 |
| 6,985,079 | B1 | * | 1/2006  | Pinter et al. | ................. | 340/575 |
| 7,158,022 | B2 | * | 1/2007  | Fallon        | ........................ | 340/506 |

* cited by examiner

*Primary Examiner*—Hung T. Nguyen
(74) *Attorney, Agent, or Firm*—John P. O'Banion

(57) ABSTRACT

A system is provided for testing and enhancing the alertness of operators who monitor video surveillance imagery. Alertness is tested by displaying any of a variety of visual elements on top of or near the video imagery, and receiving input from human operators in response to the visual elements, via one or more input devices. The system further allows for economic management of human operators by transmitting imagery from many video sources to any number of operators. Video feeds are automatically switched, via software, away from an operator who wishes to take a break or has poor alertness. In this fashion, the system maximizes operator vigilance while also maximizing workflow for all available operators.

14 Claims, 6 Drawing Sheets

SYSTEM AND METHOD FOR ENHANCED ALERTNESS AND EFFICIENT DISTRIBUTED MANAGEMENT FOR VIDEO SURVEILLANCE

CROSS-REFERENCE TO RELATED APPLICATIONS

This application is a divisional of U.S. patent application Ser. No. 10/309,986 filed on Dec. 3, 2002, now U.S. Pat. No. 6,985,079, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates generally to alertness enhancement and remote security monitoring. More specifically, the invention relates to systems for measuring and maintaining the alertness of video security operators.

2. Description of the Background Art

Video surveillance is one of the most reliable and most common methods for maintaining security in government and industry. Certain sectors, e.g., airports, retail stores and casinos, require continuous real-time human surveillance. Such ongoing surveillance is critically dependant on the alertness and vigilance of the human operators who monitor the video feeds and report actual problems and potential problems. Lapses in alertness and vigilance can result in both financial damage as well as physical danger to employees and customers.

The video surveillance industry is plagued by both the expense of real-time continuous monitoring and the mistakes due to lapses in alertness by the human operators. Accordingly, the present invention recognizes that there exists an urgent need for effective methods of maintaining operator vigilance, as well as economically managing human operators for maximum efficiency.

The prior art teaches a number of techniques for monitoring operator alertness. However, these techniques are limited due to their application to vastly different areas, such as, the control of vehicles and the operation of heavy equipment. In particular, Bowles et al., U.S. Pat. No. 6,113,538, discloses a system for testing the alertness of a user prior to allowing that user to perform his or her job. The system taught by Bowles et al. is dependent upon several components which are inapplicable to the present problem, e.g., a comparison of a series of input data to a "passing data set", an overall assignment of a "pass" or "fail" state, and a portable storage device for holding user data which either visually displays pass/fail status or can prevent access to machines or work areas.

In O'Donnell et al., U.S. Pat. No. 5,344,324, a method is disclosed for testing the ability of a human to perform necessary job skills. Again, the application areas are the operation of vehicles and heavy machinery, and the system is primarily useful only to those areas. Specifically, the system performs measurements of job ability based on a test consisting of a randomly alternating set of job-related tasks. The system taught by O'Donnell is inapplicable to the present problem because it is designed for measuring ability to perform a job task, rather than measuring alertness. Moreover, it tests job-related skills rather than alertness skills, and it is dependent on two different types of alternating skill tests.

Lieberman, U.S. Pat. No. 5,682,882, describes a system for monitoring the vigilance of human subjects. This system does not address the issue of maintaining alertness through interaction, and is oriented towards ongoing monitoring of workers in the field. Moreover, this system utilizes environmental sensors and/or motion sensors as integral components, which are not appropriate or applicable to the present problem. One embodiment of the invention taught by Lieberman, evaluates performance using two types of stimuli and two switches with open and close states, which again is not applicable to the present invention. Another embodiment taught by Lieberman, is inapplicable to the present invention due to the use of stimulators and sensors rather than computer-based input and output, and due to the processing of a timing relationship between output and input, which is neither necessary nor integral to the present invention.

Another patent, Slomski, U.S. Pat. No. 4,006,539, describes a device for testing alertness and rate of perception. This device, due to its purpose of testing the rate of perception, is predicated on having substantially identical means of output to the user, with little or no variety, and having a predetermined length of a test, after which a user score is generated. These limitations are not applicable to the current invention.

BRIEF SUMMARY OF THE INVENTION

The present invention addresses these concerns with an effective system for maintaining the alertness of video security operators, as well as a system for efficiently distributing video feeds to many operators and managing those operators economically over a network.

The alertness maintenance component of the present invention can be utilized for any employee involved in a visually-oriented job function. The employee will have ongoing access to a computer system, and the computer system tests and engages the employee with an ongoing series of visual stimuli, which require appropriate responses from an input device. The system is especially useful for employees whose primary job function utilizes the same computer. The visual stimuli can be presented to the side of the normal work area on the computer screen, or can be overlaid on top of the work area. The latter embodiment is especially useful for operators engaged in video surveillance.

Visual stimuli can consist of: icons that appear and need to be clicked upon; areas of the screen in which the normally viewed area is discolored, lightened, darkened, has its contrast changed, blurred, obscured, spatially filtered, or otherwise modified so that it is distinguishable from the unaltered image, and which the user needs to identify and click upon; or any number of other stimuli. For video surveillance operators, visual stimuli may also consist of pre-recorded video segments of intrusion which are interspersed into the normal ongoing video feed.

Users who fail to respond correctly to a stimulus can be notified by a minor audio alarm. Repeated failures may cause notification of a supervisor. The supervisor is typically a person, but it can be a software program residing in a computer connected to the system.

Another aspect of the present invention incorporates an inverse relationship between the time taken for the user to respond correctly to a stimulus, and the time until the next stimulus, thus forcing users with slow response times to achieve a higher state of alertness by presenting them with more rapid stimuli.

The present invention also includes a system for distribution of remote video surveillance monitoring tasks. The system is designed for economic management of human video surveillance operators. The system assumes the presence of multiple video cameras at multiple locations. Each video camera signal is digitized by a computer which makes the digitized video data available over a network, e.g., LAN, WAN or the Internet. At the same time, there are a number of human operators, each near a computer screen. These operators can be in a single central location, a set of discrete locations, or individually distributed anywhere in the world.

The operators' computers are configured to receive digitized video data, interpret it, and display it as one or more windows of motion video on an operator's video screen. There also exists a control program which keeps track of the total number of current video feeds which need to be monitored, as well as the number of available operators, and assigns one or more video feeds to each available operator for monitoring. This control program can either be located on a central server, or on each of the operator computers, the latter method requiring ongoing communication between each instance of the program. A key aspect to the control program is that it can re-assign video feeds to different operators in real-time as operators start shifts, end shifts, take breaks or are otherwise locked out of the system.

An exemplary, non-limiting embodiment of an operator computer interface includes a button for initiating an alarm condition if the operator witnesses a possible intrusion or other critical event. If there are multiple video feeds being viewed on the same screen, the interface can also include a method for choosing which of the video feeds is the cause for alarm. There may also be a button for requesting a break or ending a shift, which notifies the control program to send the video feeds to other operators. Finally, in order to help verify potential alarm events, there will often be a rewind button for viewing recently seen events again.

A system will normally have a maximum number of video feeds which can be viewed by any one operator. This could be just one, but will more often be four, broken out into quadrants of the screen. So if there are "n" available operators and "m" maximum video feeds per operator, and a total number of video feeds, t, it must be true that t<m*n.

However, there is the risk that t>m*n. In such a case, the control program may choose from two options. First, it can temporarily increase the maximum number of video feeds per operator (for example, allowing some operators to view five signals instead of four.) Alternatively, it can choose to swap video feeds in and out, so for example a given signal may only be viewable 90% of the time. In the latter case, the system will swap fairly regularly, so, for example, a given video feed would not go unseen for more than 20 seconds. The control program can provide incentives to operators to continue working by automatically notifying them of an increase in their compensation or otherwise reward them.

Another aspect of the present invention allows managers to connect to the network in order to economically manage groups of operators. The system will allow the managers and operators to communicate in some fashion over the computer network. In addition, the managers will have the ability to examine the ongoing schedule of active operators, and will have access to the current and recorded video feeds seen by any given operator. Some of the video feeds can be camera views of the operators themselves which can be viewed by the manager or other operators. Finally, the manager can also have the ability to lock out certain operators.

When the distributed video surveillance system is combined with the alertness maintenance component, the system also may allow managers to access the ongoing testing results of each operator. In addition, the system can lock out certain operators automatically as a result of repeated test failures.

An object of the invention is to provide a system and method for determining the alertness of video surveillance operators.

Another object of the invention is to provide a system and method for re-assigning video feeds of video surveillance operators whose alertness is faltering.

Another object of the invention is to provide a system and method for distributing video feeds among plural video surveillance operators.

Another object of the invention is to provide a system and method for re-assigning video feeds of a video surveillance operator who is taking an authorized break.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the system and method described herein. It will be appreciated, however, that the system and method may vary without departing from the basic concepts as disclosed herein.

Figure 1:
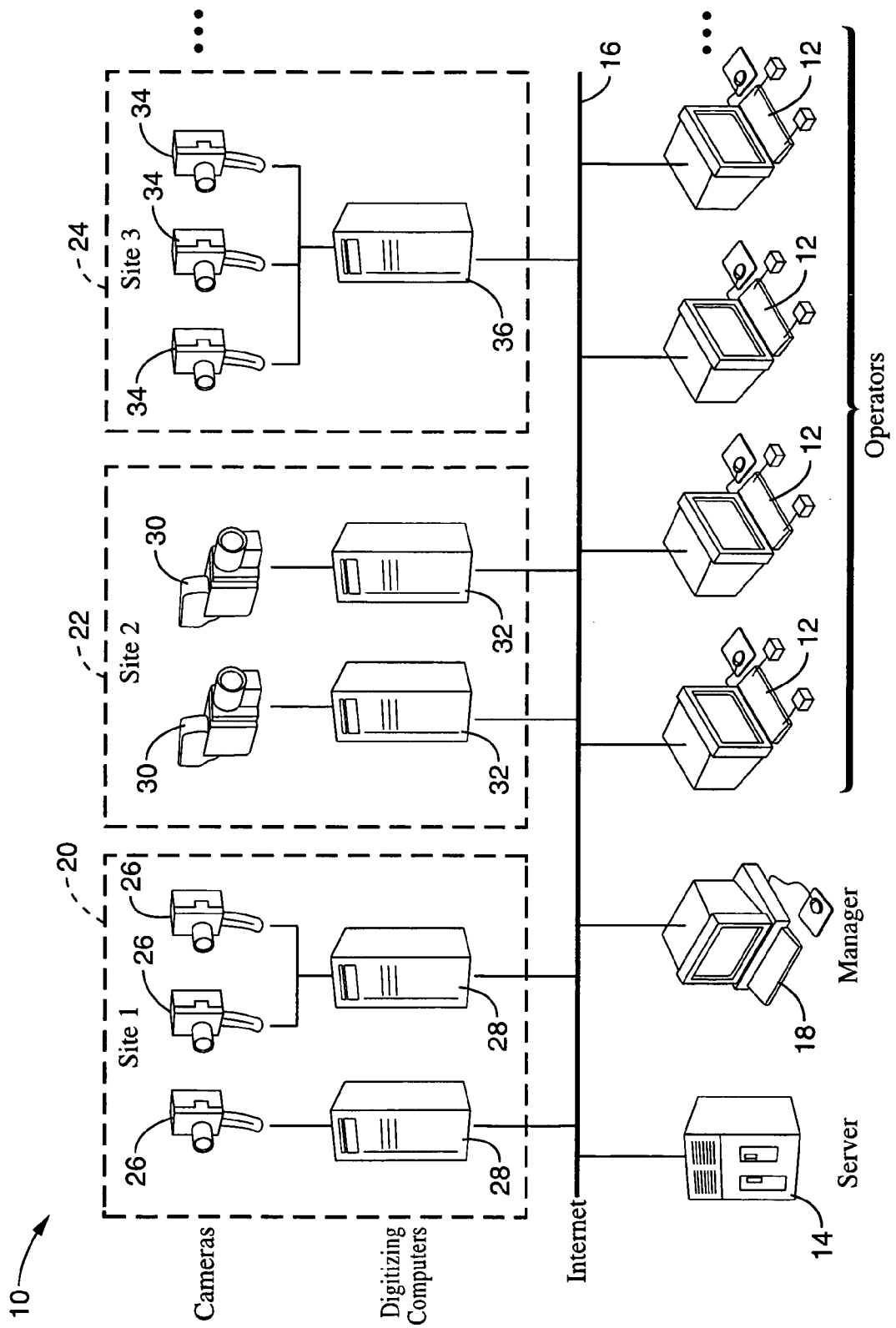
FIG. 1 is a diagram of a distributed remote video surveillance system.

The present invention comprises a system and method that can be used to determine the alertness of video surveillance operators and that can be used to manage the distribution of video feeds. Referring initially to FIG. 1, a video surveillance system is shown and generally designated 10. FIG. 1 shows that the system 10 includes plural operator computers 12 connected to system server 14. Preferably, the connections between the operator computers 12 and the system server 14 are established via the Internet 16, but other connections can be used. It is to be appreciated that the operator computers 12 can be connected to Internet 16 via respective telephone modems (not shown). Or, the operator computers 12 can connect to the Internet via other connections, e.g., cable modem, local-area network (LAN), wide-area network (WAN), T1 or any other means well known in the art. As shown in FIG. 1, a manager computer 18 is also connected to the server 14. It can be appreciated that the computers 12, 18 can also be connected to each other by a peer-to-peer network. Or, data can be transmitted to and from the computers 12, 18 via a wireless or satellite network.

As described in detail below, the system server 14 can monitor the number of video feeds and the number of available operators. Preferably, the system server 14 can assign each available operator computer 12 up to four of the real-time video feeds, unless there is a situation which requires each operator to monitor more than four video feeds. One or managers are also present on the network, e.g., stationed at the manager computer 18. In a preferred embodiment, each manager can supervise up to thirty operators. The managers can oversee the alertness of the operators and communicate with them through computer interfaces. Preferably, the manager can also call up the same video stream that any operator is viewing, as well as a recent stored history of that video feed, in order to verify alarm notifications.

FIG. 1 shows a first surveillance site 20, a second surveillance site 22, and a third surveillance site 24. As shown, plural surveillance cameras 26 are placed at the first surveillance site 20. In a preferred embodiment, the surveillance cameras 26 at the first surveillance site 20 are connected to the Internet 16 via plural digitizing computers 28. FIG. 1 shows that plural surveillance cameras 30 are placed at the second surveillance site 22 and are preferably connected to the Internet 16 via plural digitizing computers 32. The third surveillance site 24 also includes plural surveillance cameras 34 that are connected to the Internet 16 via a single digitizing computer 36. It can be appreciated that the digitizing computers 28, 32, 36 can be separate from the cameras 26, 30, 34 or integral to the cameras 26, 30, 34. It can also be appreciated that some digitizing computers can only digitize one video feed at a time. Accordingly, a single digitizing computer may only be able to work in conjunction with a single camera or a single digitizing computer may work with multiple cameras. Also, each camera 26, 30, 34 provides a video feed comprising plural video signals.

Figure 2:
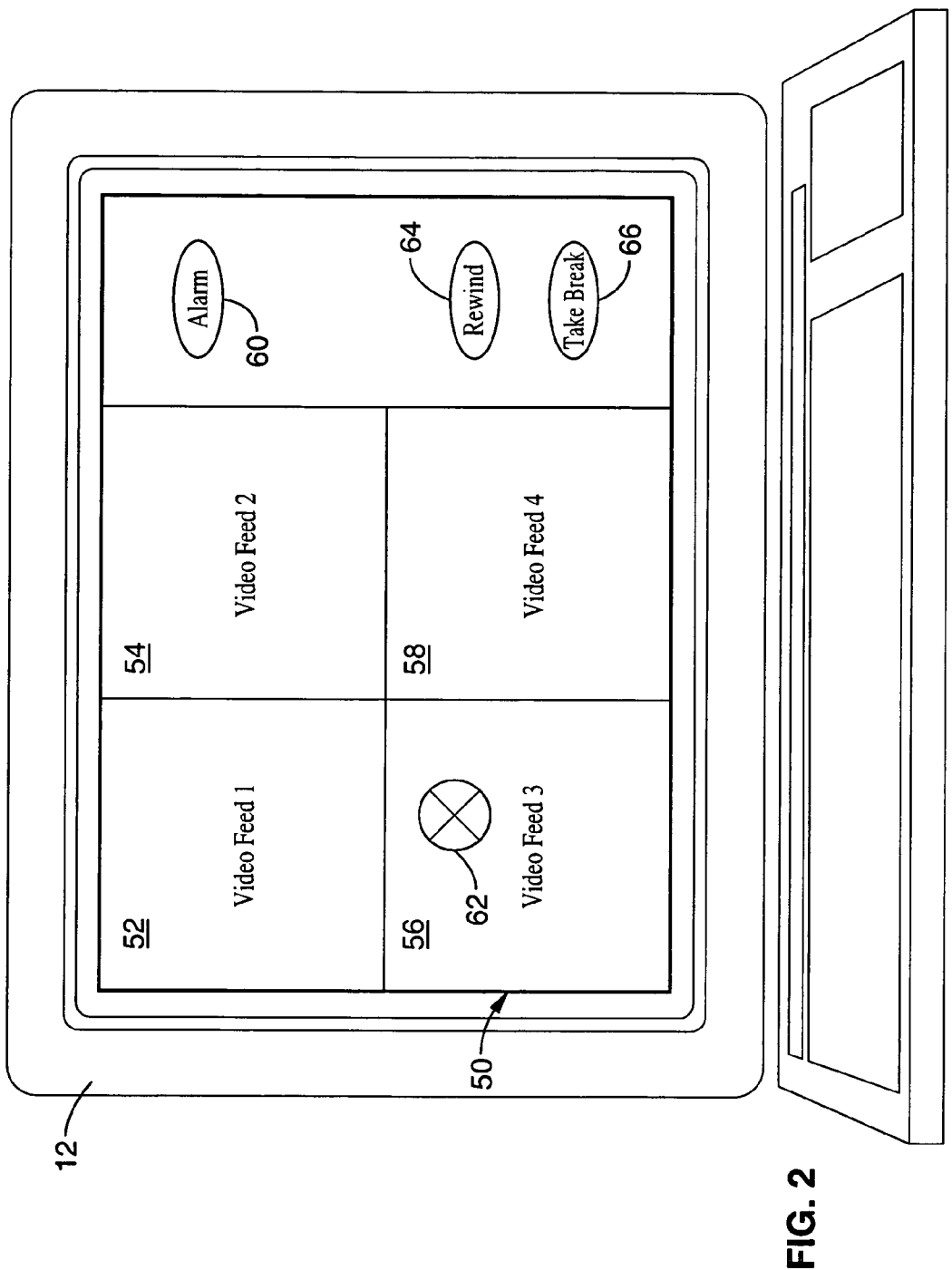
FIG. 2 is a view of a surveillance screen.

Referring to FIG. 2, an exemplary, non-limiting embodiment of a surveillance screen that can be displayed at an operator computer 12 is shown and generally designated 50. FIG. 2 shows that the surveillance screen 50 preferably includes four sub-screens 52, 54, 56, 58. A respective video feed is linked to each sub-screen 52, 54, 56, 58 and can be viewed therein. It can be appreciated that the video feeds may be from the same location or from different locations. It can also be appreciated that the surveillance screen 50 can be divided into to more than the four sub-screens 52, 54, 56, 58 shown in FIG. 2. As shown in FIG. 2, the surveillance screen 50 includes an "alarm" button 60 that can be toggled using a computer mouse (not shown) if the operator views an alarm situation, e.g., a theft, break-in, etc., on one of the sub-screens 52, 54, 56, 58. Preferably, when the "alarm" button 60 is toggled, the cursor (not shown) changes into a large colored, e.g., red, pointer 62 and the operator is instructed to point to and select which of the four video streams exhibited the alarm condition.

FIG. 2 further shows that the surveillance screen 50 includes a "rewind" button 64. In a preferred embodiment, the "rewind" button 64 can be toggled if an operator monitoring the sub-screens 52, 54, 56, 58 thinks an alarm situation may have occurred at a particular site, but is not sure. By toggling the "rewind" button 64, a surveillance control screen, described below, is presented to the operator. As shown in FIG. 2, the surveillance screen 50 preferably includes a "take break" button 66. When the "take break" button 66 is toggled, the operator break logic, described in detail below, is triggered.

Figure 3:
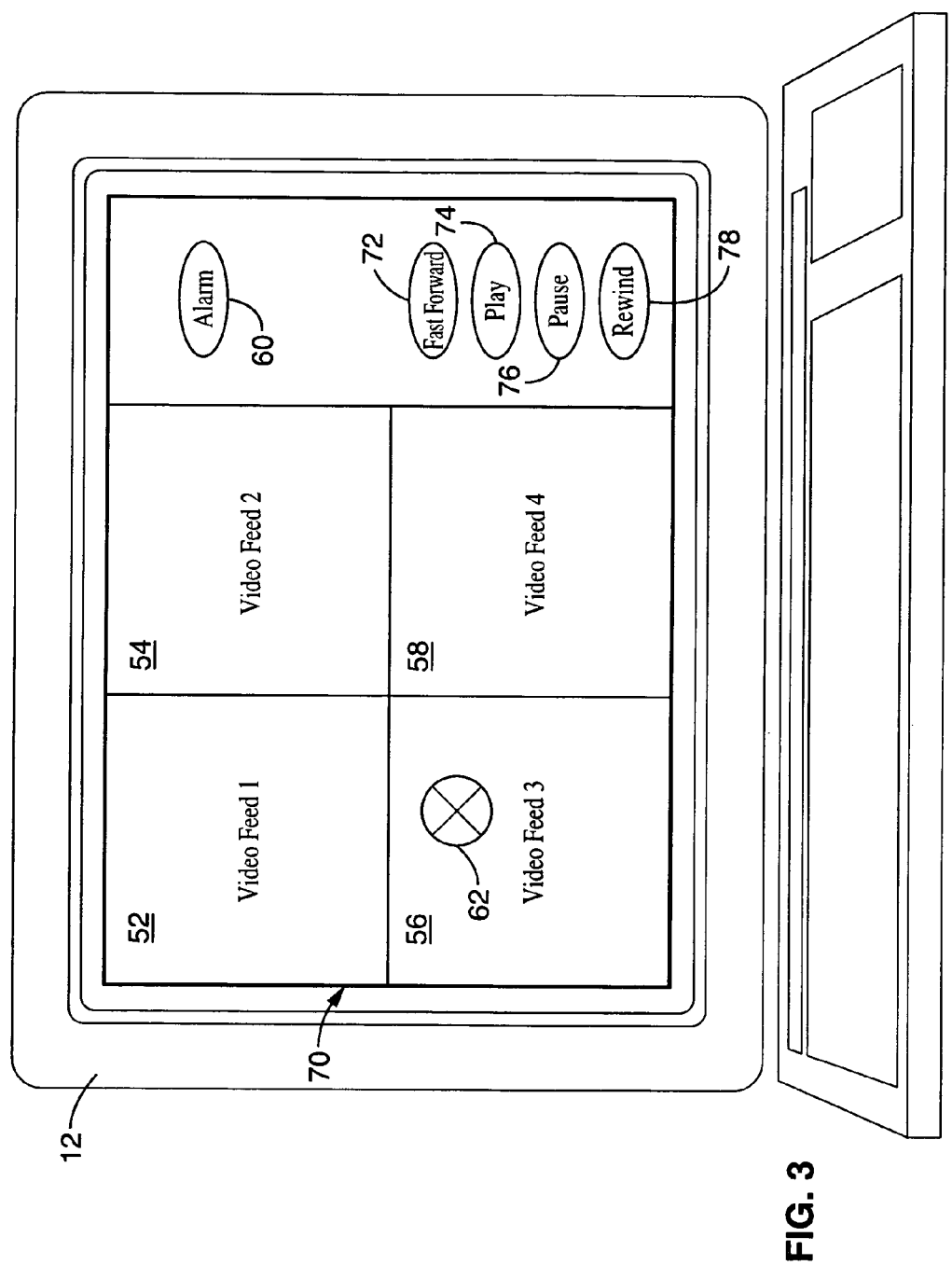
FIG. 3 is a view of a surveillance control screen.

FIG. 3 shows an exemplary, non-limiting embodiment of a surveillance control screen that can be presented to an operator when the "rewind" button 64, described above, is toggled by the operator. FIG. 3 shows that the surveillance control screen, generally designated 70, continues to display the four sub-screens 52, 54, 56, 58 and the "alarm" button 62, described above. In a preferred embodiment, the surveillance control screen 70 further includes standard video play controls, e.g. a "fast forward" button 72, a "play" button 74, a "pause" button 76, and a "rewind" button 78. Accordingly, the operator can choose the sub-screen 52, 54, 56, 58 in which the alarm conditioned was observed and then, manipulate the video content available via the particular video feed to determine if an alarm condition actually occurred.

If an alarm condition has occurred, the operator can trigger the "alarm" button 62. In a preferred embodiment, a manager can receive notification of the alarm condition and make a final verification of that condition before acting on the alarm. Preferably, the operator has the option of utilizing a designated keystroke or other interface device to place a frame marker on a particular frame of video that most clearly shows the alarm condition. The manager can then access that frame marker to more quickly verify the alarm condition.

It is to be understood that each operator computer 12 and/or the server 14 can include a series of computer-executable instructions, as described below, that can determine if a particular operator at a particular operator computer 12 is alert and able to continue his or her surveillance job. Also, the computer-executable instructions can be used to balance the workload among the operators stationed at the individual operator computers 12. Preferably, the instructions can also be used to authorize an operator break and transfer his or her workload to other operators during that break. The instructions may be contained in random access memory (RAM) within each computer 12 and/or server 14 or on a data storage device with a computer readable medium, such as a computer diskette. Or, the instructions may be stored on a magnetic tape, conventional hard disk drive, electronic read-only memory (ROM), optical storage device, or other appropriate data storage device or transmitting device thereby making a computer program product, i.e., an article of manufacture according to the invention. In an illustrative embodiment of the invention, the computer-executable instructions may be written, e.g., using HTML.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program elements in a form that instructs a digital processing apparatus (that is, a computer) to perform a sequence of function steps corresponding to those shown.

Figure 4:
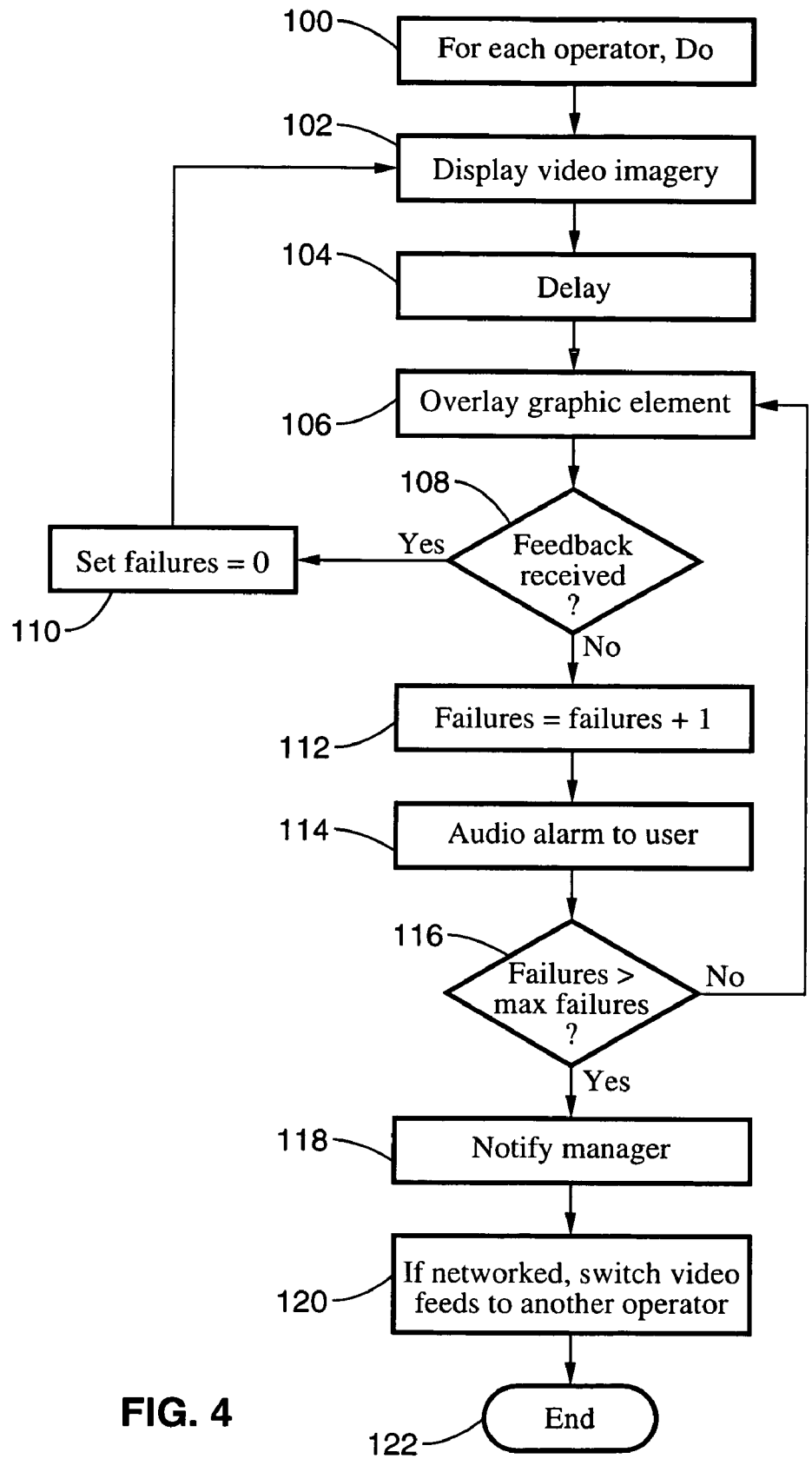
FIG. 4 is a flow chart of the operator alertness logic of the present invention.

Referring to FIG. 4, the operating logic of the present invention is shown and commences at block 100 with a do loop, wherein for each operator the succeeding steps are performed. At block 102, video imagery from one or more video feeds is displayed at an operator computer 12. Moving to block 104, after the video imagery begins the system 10 continues to display the video imagery, but delays for a pre-determined time period before a graphic element is overlaid on the video imagery at block 106. Preferably, the graphic elements include interactive visual stimuli that require operator feedback. The graphic elements can be visual stimuli that require a particular response. For example, the graphic elements can oscillate between small transparent icons of a target, and geometric areas of discoloration of the underlying video. Either of these visual signals can randomly appear anywhere on any of the video fees, described above, or they can follow a pattern to ensure that the operator's eyes are scanning all of the video feeds. The graphic elements can also be displayed adjacent to the work area at the operator computer 12, i.e., the area of the computer display at which the video imagery is displayed. In all cases, the operator is expected to point and click on or near the visual signals. It is to be understood that the graphic elements can include pre-recorded video surveillance segments having alarm situations. The pre-recorded segments can be randomly inserted into the normal video feeds being viewed by the operators.

Continuing to decision diamond 108, it is determined whether feedback from the operator has been received, preferably the feedback should be correct and timely. If so, the logic moves to block 110 where a "failures" value is set equal to zero. Thereafter, the logic returns to block 102 and continues, as described above.

Returning to decision diamond 108, if feedback is not received, the logic proceeds to block 112 and the "failures" value is increased by a value of one. At block 114, an audio alarm is sounded to indicate to the operator that he or she missed the interactive graphic element. Moving to decision diamond 116, it is determined whether the "failures" value has surpassed a predetermined maximum value. If not, the logic returns to block 106 and continues as described above. In a preferred embodiment, the time between presentation of a graphic element and the receipt of a correct user feedback is inversely proportional to the prior response time.

At decision diamond 116, if the "failures" value exceeds the maximum "failures" value, the logic moves to block 118 where a manager is notified—preferably via the manager computer 18. Proceeding to block 120, if the operator computers 12 are networked, as described above, the system will automatically switch the video feeds of the operator whose alertness is waning to another operator. The logic then ends at state 122.

Figure 5:
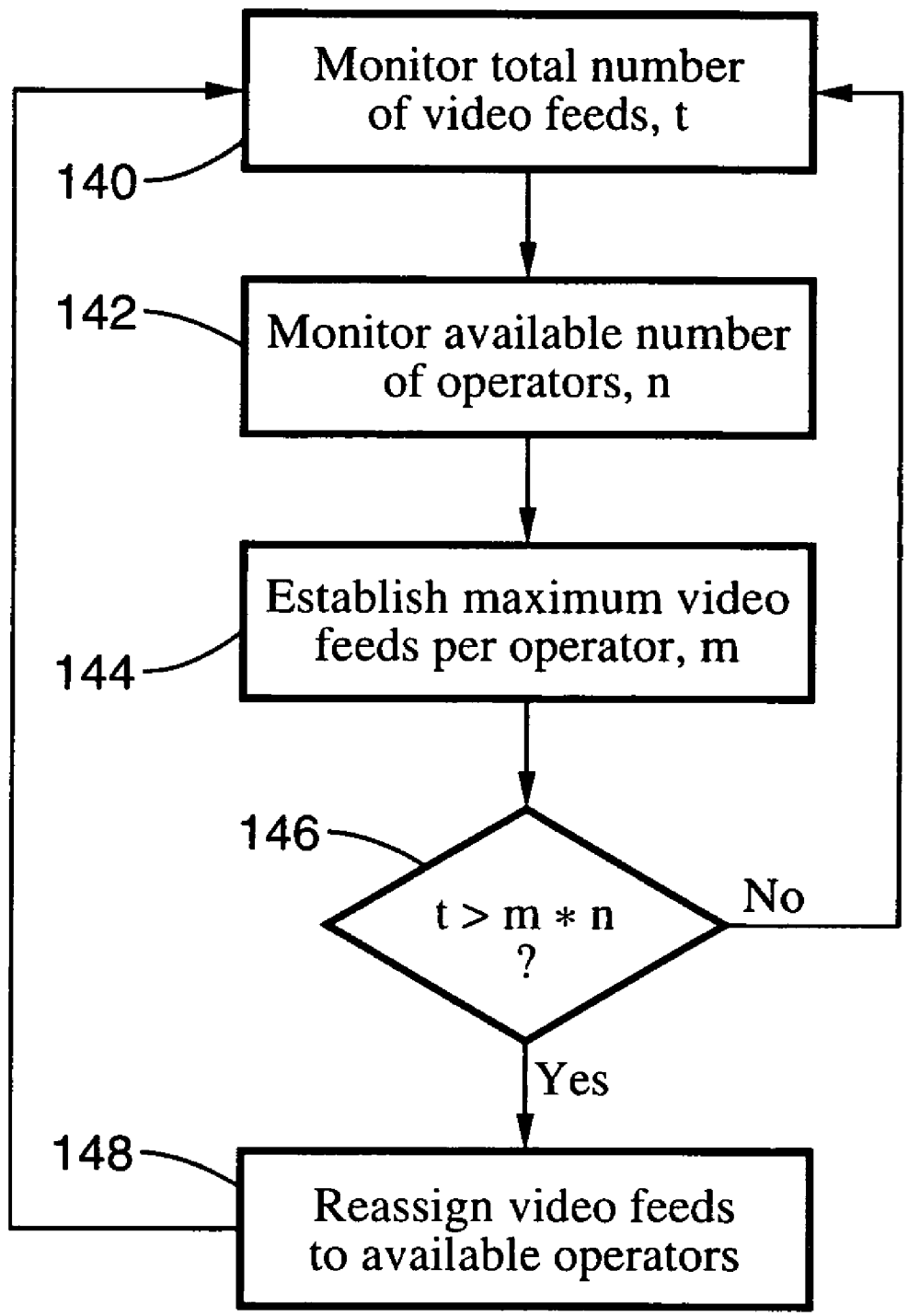
FIG. 5 is a flow chart of the video feed distribution logic of the present invention.

Referring now to FIG. 5, the video feed distribution logic of the present invention is shown and commences at block 140 where the total number of video feeds, t, is monitored. At block 142, the available number of operators, n, is also monitored. Moving to block 144, a preferred maximum video feeds per operator, m, is established. Next, at decision diamond 146, it is determined whether the total number of video feeds, t, is greater than the product of the maximum video feeds per operator, m, and the number of available operators, n. If not, the logic moves to block 140, and the logic continues as described above. If the total number of video feeds, t, is indeed greater than the product of the maximum video feeds per operator, m, and the number of available operators, n, the logic continues to block 148 where video feeds are re-assigned to available operators to spread the workload across the operators. In other words, if each operator is viewing four feeds, additional feeds can be temporarily added to each operator beyond the preferred maximum video feeds per operator, m. After block 148, the logic returns to block 140 and continues, as described above.

As an alternative to re-assigning video feeds, described in block 148, the system can swap video feeds in and out. For example, each video feed displayed at an operator computer 12 may only be viewable ninety percent (90%) of the time. In this case, the system will swap the signals fairly regularly, e.g., every twenty seconds, so that any individual video feed will not go unseen for too much time.

Figure 6:
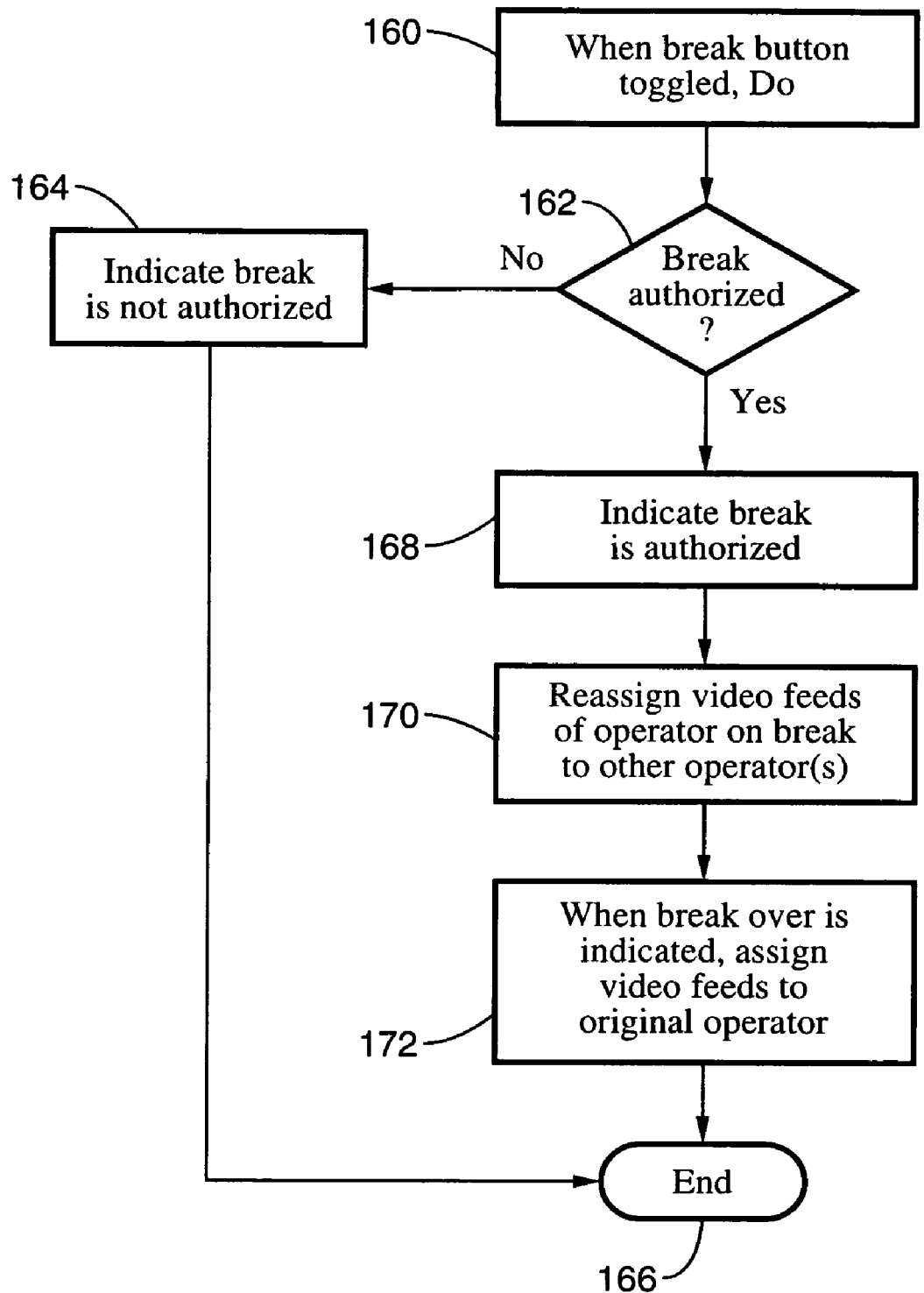
FIG. 6 is a flow chart of the operator break logic of the present invention.

Referring to FIG. 6, the operator break logic of the present invention is shown and commences at block 160, where when the "take break" button 66 (FIG. 2) is toggled, the following steps are performed. At decision diamond 162, it is determined whether the break is authorized. For example, the break may be unauthorized if the operator has recently taken a break or if too many operators are already on break. If the break is not authorized, the logic proceeds to block 164, where it is indicated to the operator requesting a break that it is not authorized. The logic then ends at state 166. Returning to decision diamond 162, if the break is authorized, the logic moves to block 168 where it is indicated to the operator that the break is authorized. Next, at block 170, the video feeds monitored by the operator on break are re-assigned to other operators during that break. At block 172, when the operator indicates that his or her break is over, some video feeds are returned to that operator. These video feeds can be the video feeds that the operator was monitoring prior to the break or different video feeds. This indication can be as simple as the operator again toggling the "take break" button 66 (FIG. 2). The logic then ends at state 166. It can be appreciated that in the above described logic, breaks can always be automatically authorized.

It can be appreciated by those skilled in the art the present embodiments of the invention, described above, can be utilized slightly differently. For example, in a small facility with a single on-staff operator there may not be a need for distribution of video signals. However, there is still a need to monitor the operators alertness. In such a case, signals will not be re-assigned, but an increasingly loud alarm can be sounded when the operator begins showing signs that his alertness is faltering. Also, the visual stimuli used to maintain alertness can dynamically change while they are visible, e.g., starting small and faded into the background and growing increasingly larger and more visually distinct.

Accordingly, it can be seen that this invention provides a means for effectively monitoring the alertness of individual surveillance operators. Also, the workload, i.e., the total number of video feeds, can be relatively easily distributed between the networked operator computers 12. Finally, this invention provides a means for re-assigning video feeds when individual operators take breaks. It can be appreciated that the above-described invention provides a system by which video surveillance operators can be contracted individuals working out of their homes at relatively economical rates. These operators can be paid for the amount of active time spent monitoring, with the stipulation that they can take a break on a pre-determined schedule, e.g., ten minutes each hour. The system can also adjust for periods when not enough operators are available by temporarily offering higher rates in order provide incentive to operators to come on line. Notification of the higher rate offerings can be accomplished automatically via email or automatic phone dialing.

The above-described system is also relatively more economical because operators can be stationed at large centralized facilities or they can work out of home. In either case, the operators can be located in areas having relatively low costs of living. Quality of work is maximized using the operator alertness logic. Moreover, fewer operators are needed throughout the entire system. For example, in a conventional surveillance scheme, ten individual surveillance sites having six cameras each and a maximum of four video feeds per operator require two operators per site, or twenty total operators. On the other hand, in the distributed system of the present invention, since there are sixty individual feeds, only fifteen operators are necessary—one operator per every four video feeds.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for distribution of remote video surveillance monitoring tasks, comprising:
    at least one computer network;
    at least one surveillance site;
    at least one video camera at each surveillance site, the camera being connected to the computer network;
    at least one operator computer connected to the computer network and receiving at least one video feed from the video camera; and
    programming associated with the system for
        determining the availability of operators,
        directing the operator computer to receive at least one video feed, and
        re-assigning the video feed to another operator computer.

2. A system as recited in claim 1, further comprising:
    a centralized server;
    said programming being located on the centralized server.

3. A system as recited in claim 1, further comprising programming associated with the system for:
    monitoring a total number of video feeds;
    monitoring a number of available operators, and
    establishing a maximum video feeds per operator.

4. A system as recited in claim 3, further comprising programming associated with the system for:
    determining whether the total number of video feeds exceeds the product of the number of available operators and the maximum video feeds per operator.

5. A system as recited in claim 4, further comprising programming associated with the system for:
    temporarily increasing the maximum video feeds per operator, if the total number of video feeds exceeds the product of the number of available operators and the maximum video feeds per operator.

6. A system as recited in 1, further comprising programming associated with the system for:
    receiving a notification of a break or a request for a break from at least one operator;
    authorizing the break, if authorization is necessary; and
    re-assigning the video feeds of the operator on break to another operator.

7. A system as recited in claim 6, further comprising programming associated with the system for:
    receiving an indication that the break is over; and
    assigning available video feeds to the operator who requested a break.

8. A system as recited in claim 6, wherein the operator computer includes a "take break" button that can be toggled when an operator wishes to take a break.

9. A system as recited in claim 1, wherein the operator computer includes a surveillance screen that is divided into multiple sub-screens, each sub-screen receiving a video feed.

10. A system as recited in claim 1, wherein the operator computer includes an "alarm" button.

11. A system as recited in claim 10, further comprising programming associated with the system for:
    allowing an operator to indicate an alarm condition by toggling the "alarm" button.

12. A system as recited in claim 11, further comprising programming associated with the system for:
    allowing an operator to choose a sub-screen on which the alarm condition was viewed.

13. A system as recited in claim 12, wherein the operator computer includes a "rewind" button that can be toggled when an operator wishes to rewind video content provided by a particular video feed.

14. A system as recited in claim 1, further comprising:
    at least one manager computer; and
    programming associated with the system for:
        allowing a manager to communicate with an operator; and
        allowing a manager to monitor an operator.

* * * * *